(12) United States Patent
Akiyama et al.

(10) Patent No.: US 10,907,724 B2
(45) Date of Patent: Feb. 2, 2021

(54) DRIVE FORCE TRANSMISSION DEVICE AND METHOD FOR MANUFACTURING SAME

(71) Applicants: JATCO Ltd, Fuji (JP); NISSAN MOTOR CO., LTD., Yokohama (JP)

(72) Inventors: Mitsuhiro Akiyama, Fuji (JP); Shogo Fujii, Fuji (JP); Tahei Toyoshima, Atsugi (JP); Masakazu Tamura, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/644,896

(22) PCT Filed: Nov. 1, 2018

(86) PCT No.: PCT/JP2018/040676
§ 371 (c)(1),
(2) Date: Mar. 5, 2020

(87) PCT Pub. No.: WO2019/008219
PCT Pub. Date: May 9, 2019

(65) Prior Publication Data
US 2020/0263781 A1    Aug. 20, 2020

(30) Foreign Application Priority Data
Nov. 2, 2017 (JP) .................. 2017-213112

(51) Int. Cl.
F16H 57/02    (2012.01)
F16H 57/04    (2010.01)
F16H 57/03    (2012.01)

(52) U.S. Cl.
CPC ......... *F16H 57/0421* (2013.01); *F16H 57/03* (2013.01); *F16H 2057/02017* (2013.01)

(58) Field of Classification Search
CPC .... F16H 57/03; F16H 57/042; F16H 57/0421; F16H 57/0423; F16H 57/0424; F16H 2057/02017
See application file for complete search history.

(56) References Cited

U.S. PATENT DOCUMENTS 4,414,861 A * 11/1983 Witt .................... F16H 57/0427
184/13.1
9,435,421 B2 * 9/2016 Mafune ............... F16H 57/0409
(Continued)

FOREIGN PATENT DOCUMENTS

JP    2011058519 A  *  3/2011
JP    2011-117467 A    6/2011
(Continued)

OTHER PUBLICATIONS

International Search Report for PCT/JP2018/040676 dated Jan. 29, 2019 (with English translation).
(Continued)

*Primary Examiner* — Adam D Rogers
(74) *Attorney, Agent, or Firm* — Foley & Lardner LLP

(57) ABSTRACT

A driving force transmission device includes: a gear; a case receiving the gear; a baffle plate positioned between a side surface of the gear and the case, the baffle plate including a downstream side end portion positioned at a most downstream position in a rotation direction of the gear, the case including a rib protruding toward the downstream side end portion, a clearance positioned between a surface of the rib and a surface of the baffle plate, the rib including a linear portion crossing a rotation direction of the gear.

7 Claims, 6 Drawing Sheets

(56) References Cited

U.S. PATENT DOCUMENTS

| | | | |
|---|---|---|---|
| 9,772,027 B2* | 9/2017 | Preston | ............... F16H 57/0423 |
| 2011/0126667 A1 | 6/2011 | Nagahama | |
| 2019/0085971 A1* | 3/2019 | Itou | .................... F16H 57/0423 |
| 2020/0263782 A1* | 8/2020 | Toyoshima | ......... F16H 57/0423 |

FOREIGN PATENT DOCUMENTS

| | | | | |
|---|---|---|---|---|
| JP | 2012-102818 A | 5/2012 | | |
| JP | 2012-220004 A | 11/2012 | | |
| JP | 2018-076880 A | 5/2018 | | |
| WO | WO-2019088220 A1 * | 5/2019 | ............. | F16H 57/04 |

OTHER PUBLICATIONS

U.S. Appl. No. 16/646,035, filed Mar. 10, 2020, Jacto Ltd; Nissan Motor Co Ltd.

* cited by examiner (a)

(b)

(a)

(b)

DRIVE FORCE TRANSMISSION DEVICE AND METHOD FOR MANUFACTURING SAME

TECHNICAL FIELD

This invention relates to a driving force transmission device and a method for manufacturing same.

BACKGROUND ART

A patent document 1 discloses a transmission including a baffle plate which is positioned between a final gear and a case for decreasing a stirring resistance of the final gear and a differential gear by a hydraulic fluid.

In a case where the clearance between the case and the baffle plate is large, the hydraulic fluid flowing from the oil pan side through the clearance into the final gear side is increased, so that the stirring resistance of the final gear is increased.

It is conceivable that a seal member and so on is disposed in the clearance between the case and the baffle plate, as a countermeasure against the hydraulic fluid flowing into the final gear side.

However, this may increase a manufacturing cost of the transmission, and deteriorate an assemblability of the transmission.

Accordingly, it is required not to increase the stirring resistance.

PRIOR ART DOCUMENT

Patent Document

Japanese Patent Application Publication No. 2012-102818

SUMMARY OF THE INVENTION

In the present invention, a driving force transmission device comprises:
a gear;
a case receiving the gear;
a baffle plate positioned between a side surface of the gear and the case,
the baffle plate including a downstream side end portion positioned at a most downstream position in a rotation direction of the gear,
the case including a rib protruding toward the downstream side end portion,
a clearance positioned between a surface of the rib and a surface of the baffle plate,
the rib including a linear portion crossing a rotation direction of the gear.

In the present invention, the case includes the rib. With this, it is possible to decrease the clearance between the case and the baffle plate. With this, it is possible to decrease the amount of the hydraulic fluid flowing into the gear side, and to preferably prevent the increase of the stirring resistance of the final gear.

DESCRIPTION OF EMBODIMENTS

Hereinafter, one embodiment according to the present invention is explained in a case where a driving force transmission device is an automatic transmission for a vehicle.

Figure 1:
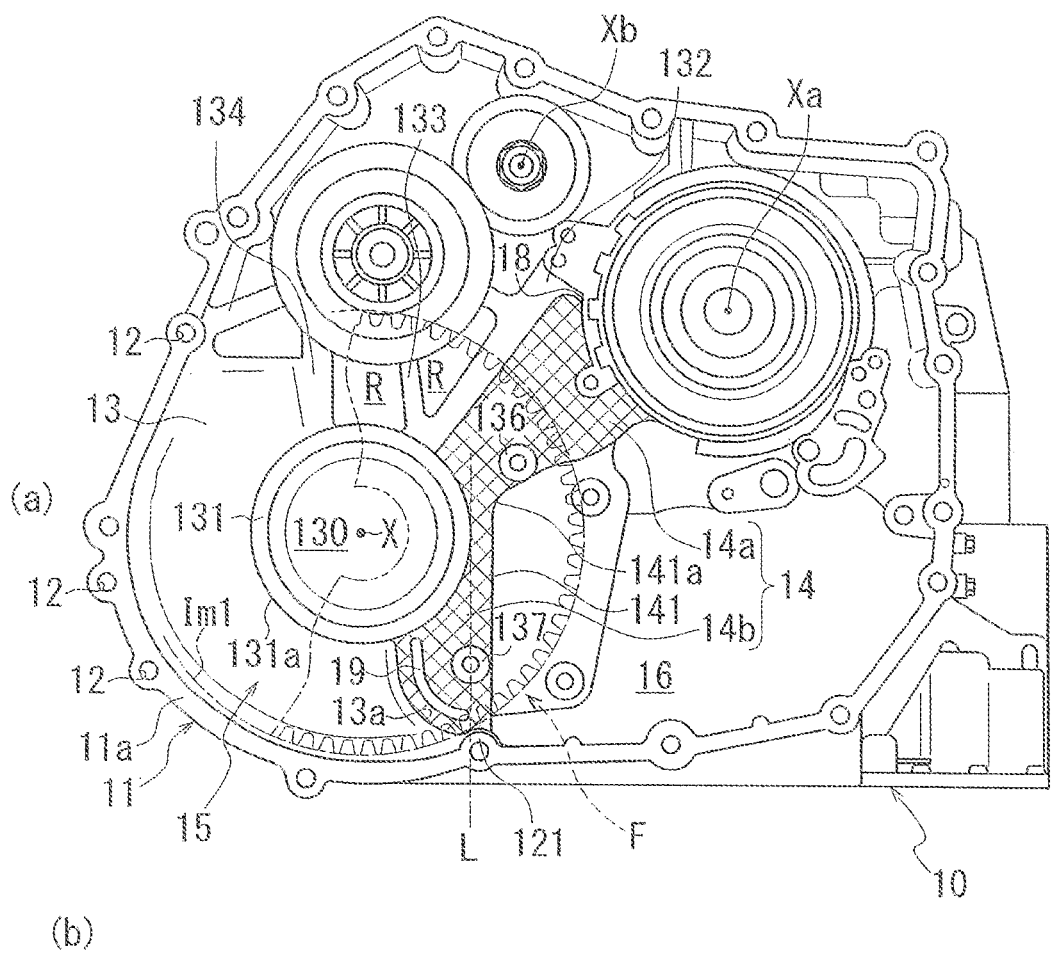
FIG. 1 are views for explaining a transmission case.
Figure 1:
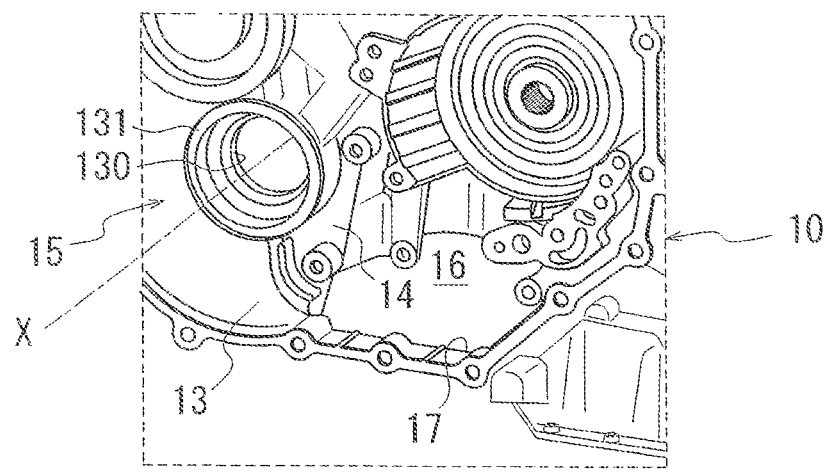

FIG. 1 are views for explaining a transmission case 10. FIG. 1(a) is a plan view showing the transmission case 10 when viewed from a torque converter (not shown) side. FIG. 1(b) is a perspective view of the transmission case 10 when viewed from an obliquely upper side, which is for explaining an opening portion 16 of the transmission case 10. Besides, in FIG. 1(a), a cross hatching is added to a region of a recessed portion 14 in a wall portion 13 of the transmission case 10 to visually differentiate the region of the recessed portion 14 from other regions.

Hereinafter, position relationships of constituting elements are explained with reference to a setting state of the transmission case 10 in FIG. 1(a).

In the following explanations, an "upper side" means an upper side with respect to the setting state of the automatic transmission. A "lower side" means a lower side with respect to the setting state of the automatic transmission.

As shown in FIG. 1(a), a receiving portion 15 of a differential device is provided at a lower portion of the transmission case 10. This receiving portion 15 is opened to the torque converter (not shown) side (a front side of a paper).

A through hole 130 and a boss portion 131 are provided at a central portion of the receiving portion 15. The through hole 130 penetrates through the wall portion 13 in a thickness direction (a direction of an axis X). The boss portion 131 has a ring shape surrounding the through hole 130.

This boss portion 131 rotatably supports a differential case (not shown) including an outer circumference on which a final gear F is fixed.

A rotation driving force is transmitted from a shift mechanism section (not shown) to the final gear F. With this, the final gear F is arranged to rotate as a unit with the differential case (not shown) around the axis X.

The differential case (not shown) is connected to an axel shaft (not shown). A rotation driving force transmitted from the shift mechanism section (not shown) is transmitted through the axel shaft to driven wheels (not shown).

A circumferential wall portion 11 of the transmission case 10 includes a portion which is near the final gear F, and which has an arc shape surrounding an outer circumference of the final gear F when viewed from the direction of the axis X.

The circumferential wall portion 11 includes a plurality of bolt holes 12 provided at intervals in a circumferential direction. An end surface 11a of the circumferential wall portion 11 on the front side of the paper is a joint surface of a cover surrounding the torque converter (not shown).

The transmission case 10 is provided with a wall portion 13 which is positioned inside the circumferential wall portion 11, and which covers a side surface of the final gear F.

The wall portion 13 is provided on the back side of the paper with respect to the final gear F, in a direction along the side surface of the final gear F.

The wall portion 13 is provided with ribs 132, 133, and 134 each of which extends from the outer circumference of the boss portion 131 in radial directions. Regions R among these ribs 132, 133, and 134 are small thickness portions in which thicknesses in the direction of the axis X is smaller than that of the wall portion 13.

The wall portion 13 includes a stepped portion 13a provided in a region on the lower side of the boss portion 131 in the drawing. The stepped portion 13a is formed into a substantially arc shape surrounding an outer circumference of a support cylinder 137 described later, with a predetermined interval when viewed from the front side (the torque converter (not shown) side).

As shown in FIG. 1(a), the wall portion 13 of the transmission case 10 is provided with a recessed portion 14 which is recessed on the back side of the paper with respect to a surface of the wall portion 13, and which is provided on an opening portion 16 side (the right side in the drawing) when viewed from the boss portion 131.

This recessed portion 14 is provided in a region from the rib 132 to the stepped portion 13a of the wall portion 13 in the circumferential direction around the axis X, when viewed from the front side of the paper. The stepped portion 13a is a wall portion defining a boundary between the wall portion 13 and the recessed portion 14.

The recessed portion 14 includes an upper side region 14a which is on an upper side of the axis X in the drawing, and which extends along the rib 132 on a circumferential wall portion 18 side of a forward and rearward switching mechanism (not shown). Moreover, the recessed portion 14 includes a lower side region 14b which is continuous to the upper side region 14a on the lower side of the upper side region 14a, and which extends on the circumferential portion 11 side (on the lower side of the drawing) along a tangent L direction (upward and downward directions) of the outer circumference 131a of the boss portion 131.

A bolt boss portion 121 is positioned at a connection portion between the lower side region 14b and the circumferential wall portion 11.

The transmission case 10 includes the opening portion 16 which is positioned on a right side region of the recessed portion 14 in the drawing, and in which an oil pump (not shown) is disposed. This opening portion 16 is formed with a depth on the back side of the paper. The oil pump (not shown) is provided on the back side of the paper with respect to the opening portion 16.

An opening 17 (cf. FIG. 1(b)) is provided at a lower portion of the transmission case 10. An oil pan (not shown) fixed at the lower portion of the transmission case 10 is connected through the opening portion 17 to the opening portion 16.

The oil OL scooped (scraped) up by the final gear F drops on the lower side of a vertical direction by own weight. Then, this oil OL is finally returned to the oil pan (not shown) through the opening portion 17 positioned at the lower portion of the opening portion 16.

A side edge 141 of the recessed portion 14 on the opening portion 16 side includes a boundary portion 141a between the upper side region 14a and the lower side region 14b. The boundary portion 141a is positioned on an upper side of the axis X in the upward and downward directions of the drawing so as to ensure the width of the opening portion 16 in the upward and downward directions of the drawing.

Moreover, this boundary portion 141a is positioned on the axis X (the rotation axis) side of an imaginary circle Im1 along the outer circumference of the final gear F.

Accordingly, in the wall portion 13 of the transmission case 10, the opening portion 16 extends near the boss portion 131 inside the imaginary circle Im1.

With this, the width of the opening portion 16 in the leftward and rightward directions of the drawing is ensured. Moreover, a part of the region of the final gear F on the outer circumference side is disposed to be overlapped with the opening portion 16 when viewed from the direction of the axis X.

In this embodiment, the lower side region 14b of the recessed portion 14 is provided to ensure the leftward and rightward width in which the support cylinder 137 is installed.

In the recessed portion 14, the rib 19 is provided in a region between the support cylinder 137 and the stepped portion 13a on the wall portion 13 side.

Figure 2:
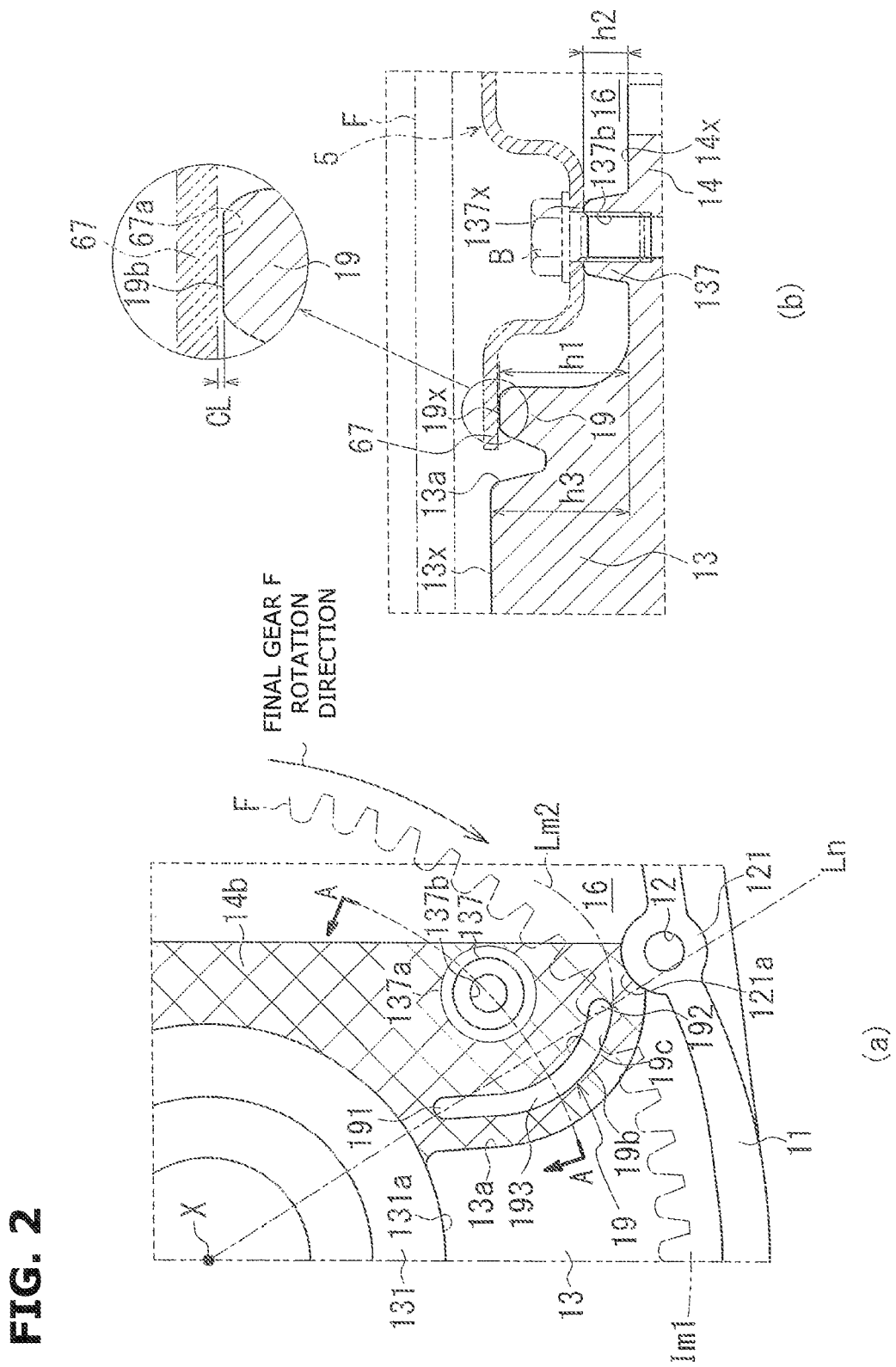
FIG. 2 are enlarged views showing a main part of the transmission case.

FIG. 2 are enlarged views showing a main part of the transmission case 10. FIG. 2(a) is a view by enlarging a portion of the transmission case 10 around the rib 19. FIG. 2(b) is a sectional view taken along an A-A line in FIG. 2(a).

Besides, in FIG. 2(a), a cross hatching is added to a portion of the recessed portion 14 (the lower side region 14b) which is recessed on the bottom side of the paper with respect to the wall portion 13. In FIG. 2(b), a portion around a flow amount (flow rate) adjusting portion 67 of a baffle plate 5 covering a plane of the recessed portion 14 on the torque converter side is shown by an imaginary line.

As shown in FIG. 2(a), the rib 19 extends in a direction crossing the rotation direction of the final gear F described later when viewed from the front side of the paper (the torque converter (not shown) side: X direction).

The rib 19 is formed along a diameter line Ln of the final gear F. The rib 19 includes an inner circumference side end portion 191 which is on the inner circumference side in the longitudinal direction of the rib 19; and an outer circumference side end portion 192 which is on the outer circumference side in the longitudinal direction of the rib 19. The end portion 191 and the end portion 192 are positioned on the same diameter line Ln.

A region of the rib 19 between the inner circumference side end portion 191 and the outer circumference side end portion 192 is positioned on a downstream side of the diameter line Ln in the rotation direction of the final gear F.

The rib 19 includes an intermediate portion 193 which is positioned between the inner circumference side end portion 191 and the outer circumference side end portion 192, and which is farthest from the diameter line Ln when viewed from the front side of the paper.

A region of the rib 19 between the intermediate portion 193 and the outer circumference side end portion 192 is formed into an arc shape surrounding the outer circumference 137a of the support cylinder 137 with a predetermined gap.

A radius of curvature of the region of the arc shape of the rib 19 is set to satisfy the following conditions.

(a) An extension line Lm2 obtained by extending the arc of the outer circumference 19b of the rib 19 does not cross the outer circumference 121a of the bolt boss portion 121.

(b) When the oil OL flowing along the inner circumference 19c of the rib 19 is generated, the oil OL is guided to the opening portion 16.

The outer circumference side end portion 192 of the rib 19 is disposed so as to satisfy the above-described radius of curvature, so as not to be abutted on the support cylinder 137, the circumferential wall portion 11, the stepped portion 13a, and the bolt boss portion 121.

The rib 19 includes a region which is on the inner circumference side end portion 191 side, and which has a shape straightly extending toward the outer circumference 131a of the boss portion 131.

The rib 19 is provided so that a distance between the rib 19 and the outer circumference 137a of the support cylinder 137 is longer toward the inner circumference side end portion 191.

In this state, the inner circumference side end portion 191 of the rib 19 is provided so as not to be abutted on the boss portion 131, the stepped portion 13a, and the support cylinder 137.

The rib 19 in this embodiment is formed by the arc portion and the straight portion which are continuous in serial with each other. The rib 19 has a linear shape when viewed in the direction of the axis X.

In this case, the "linear shape" includes "straight shape", "curved shape", and "combination of the straight shape and the curved shape". Moreover, the "linear shape" needs not to be continuous.

The rib 19 shown in FIG. 2(a) is continuous from the inner circumference side end portion 191 to the outer circumference side end portion 192. For example, a cutout, a groove and so on may be formed in the region between the end portion 191 and the end portion 192, so that the rib may have the discontinuousness.

In this embodiment, the rib 19 having the arc portion and the straight portion which are continuous in series with each other is exemplified. The shape of the rib is not limited to this configuration. For example, the rib may have a straight shape in an overall length of the longitudinal direction. Moreover, the rib may have a shape having a curved portion positioned at a middle portion of the longitudinal direction.

As shown in FIG. 2(b), the tip end surface 19x of the rib 19 on the final gear F side is a flat surface perpendicular to the rotation axis (the axis X) of the final gear F. Moreover, the tip end surface 137x of the support cylinder 137 is a flat surface perpendicular to the rotation axis (the axis X) of the final gear F.

In this embodiment, the rib 19 and the support cylinder 137 protrude toward the final gear F side from the confronting surface 14x of the recessed portion 14 which confronts the final gear F. The support cylinder 137 includes a bolt hole 137 in which a shaft portion of the bolt B is screwed.

A height h1 from the confronting surface 14x to the tip end surface 19x of the rib 19 is higher than a height h2 from the confronting surface 14x to the tip end surface 137x of the support cylinder 137.

As shown in FIG. 1, the transmission case 10 includes a support cylinder 136 provided to the recessed portion 14 to which the rib 19 is provided, in addition to the support cylinder 137.

The support cylinder 136 is provided in the upper region 14a of the recessed portion 14.

The support cylinder 136 is provided for supporting the baffle plate 5 described later, similarly to the support cylinder 137.

These support cylinders 136 and 137 protrude on the front side of the paper from the region of the recessed portion 14 which is positioned inside the imaginary circle Im1. The support cylinders 136 and 137 are provided at an interval in the circumferential direction around the axis X.

The wall portion 13 of the transmission case 10 includes the stepped portion 13a which is a boundary between the wall portion 13 and the recessed portion 14, and which is provided on the downstream side of the rib 19 in the rotation direction of the final gear F.

The stepped portion 13a is formed into an arc shape surrounding the outer circumference 19b of the rib 19 with a predetermined gap.

This stepped portion 13a extends in the radial direction of the axis X. The stepped portion 13a is provided in a region extending between the boss portion 131 and the bolt boss portion 121.

As shown in FIG. 2(b), the wall portion 13 of the transmission case 10 includes a confronting surface 13x which confronts the final gear F, at least, in a region which is abutted on the stepped portion 13a, and which is a flat surface perpendicular to the axis X.

A height h3 (height in the direction of the axis X) from the confronting surface 14x of the recessed portion 14 to the confronting surface 13x of the wall portion 13 is higher than a height h1 from the confronting surface 14x to the tip end surface 19x of the rib 19.

Figure 3:
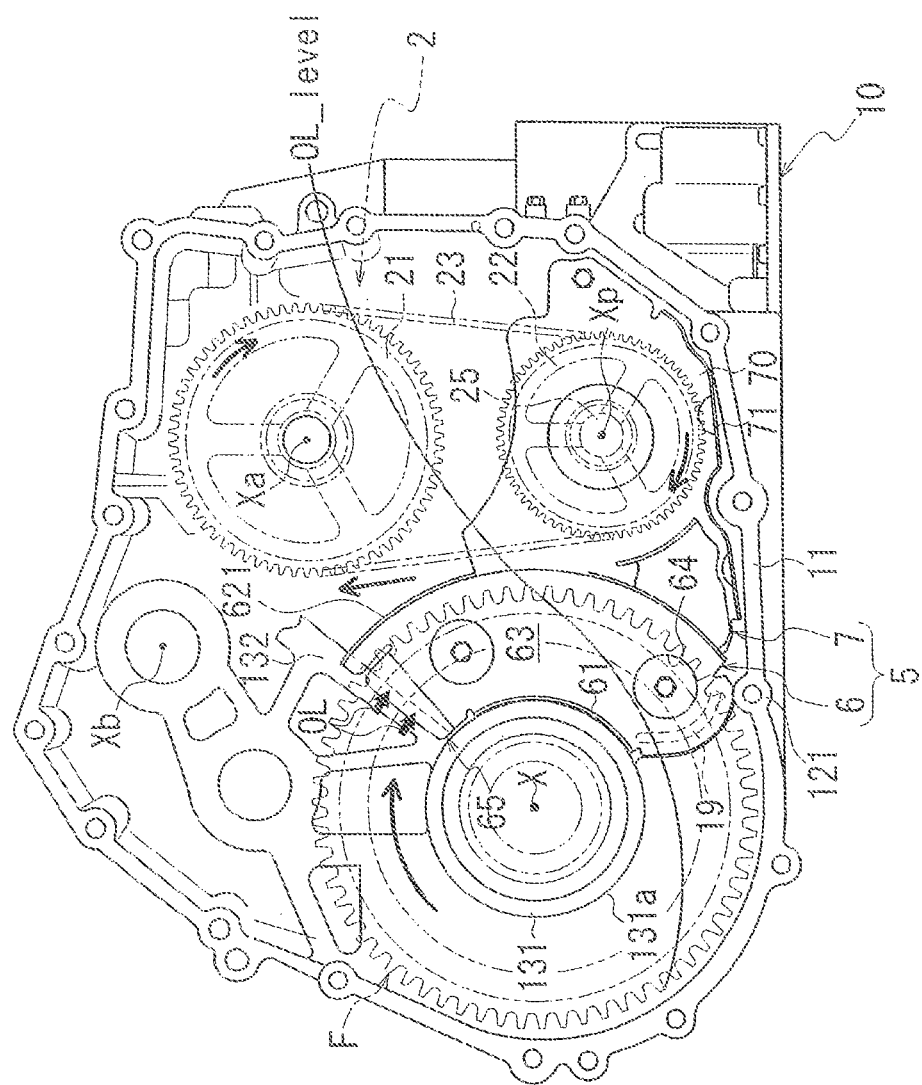
FIG. 3 is a view for explaining a disposition of a baffle plate in the transmission case.

FIG. 3 is a view for explaining a disposition of the baffle plate 5 in the transmission case 10. In this FIG. 3, an inside of the circumferential wall portion 11 of the transmission case 10 is simply shown for explaining a position relationship among the baffle plate 5, the final gear F, and a driven sprocket 22.

As described above, the oil pump (not shown) is installed in the opening portion 16 of the transmission case 10.

In this embodiment, the rotation driving force of the driving source is transmitted through a chain 23 of the rotation transmission mechanism 2 to the oil pump to drive the oil pump.

The rotation transmission mechanism 2 includes a driving sprocket 21 arranged to rotate as a unit with the input shaft; the driven sprocket 22 arranged to rotate as a unit with the output shaft 25 of the oil pump; and the chain 23 wound around the driving sprocket 21 and the driven sprocket 23.

In this embodiment, the driven sprocket 22 is arranged to rotate in a clockwise direction in the drawing. The final gear F is arranged to rotate in the clockwise direction in the drawing.

At the driving of the automatic transmission, the oil OL within the transmission case 10 is scooped (scraped) up by the rotating final gear F and the rotating driven sprocket 22.

For example, when the final gear F is rotated, an oil level OL_level of the transmission case 10 on the final gear F side is low, and an oil level OL_level of the transmission case 10 on the rotation transmission mechanism 2 side is high (cf. a line showing a height of the oil OL in FIG. 3).

As shown in FIG. 3, the rotation transmission mechanism 2 is positioned radially outside the final gear F.

Accordingly, in a case where the oil OL scooped up and scattered by the final gear F is acted to the driving sprocket 21 and the driven sprocket 22, this oil OL becomes a friction with respect to the rotations of the driving sprocket 21 and the driven sprocket 22.

Similarly, in a case where the oil scooped up and scattered by the driven sprocket 22 is acted to the final gear F, this oil becomes the friction with respect to the rotation of the final gear F.

Moreover, in a case where the oil OL scooped up and scattered by the final gear F is acted to the final gear F, this oil OL becomes the friction with respect to the rotation of the final gear F.

Accordingly, in the transmission case 10, the final gear F and the driven sprocket 22 are disposed so that positions in the direction of the axis X are deviated from each other.

Moreover, the baffle plate 5 is provided to prevent the scattering of the oil OL scooped up by the final gear F toward the rotation transmission mechanism 2 side, and to prevent the scattering of the oil OL scooped up by the driven sprocket 2 toward the final gear F side.

Figure 4:
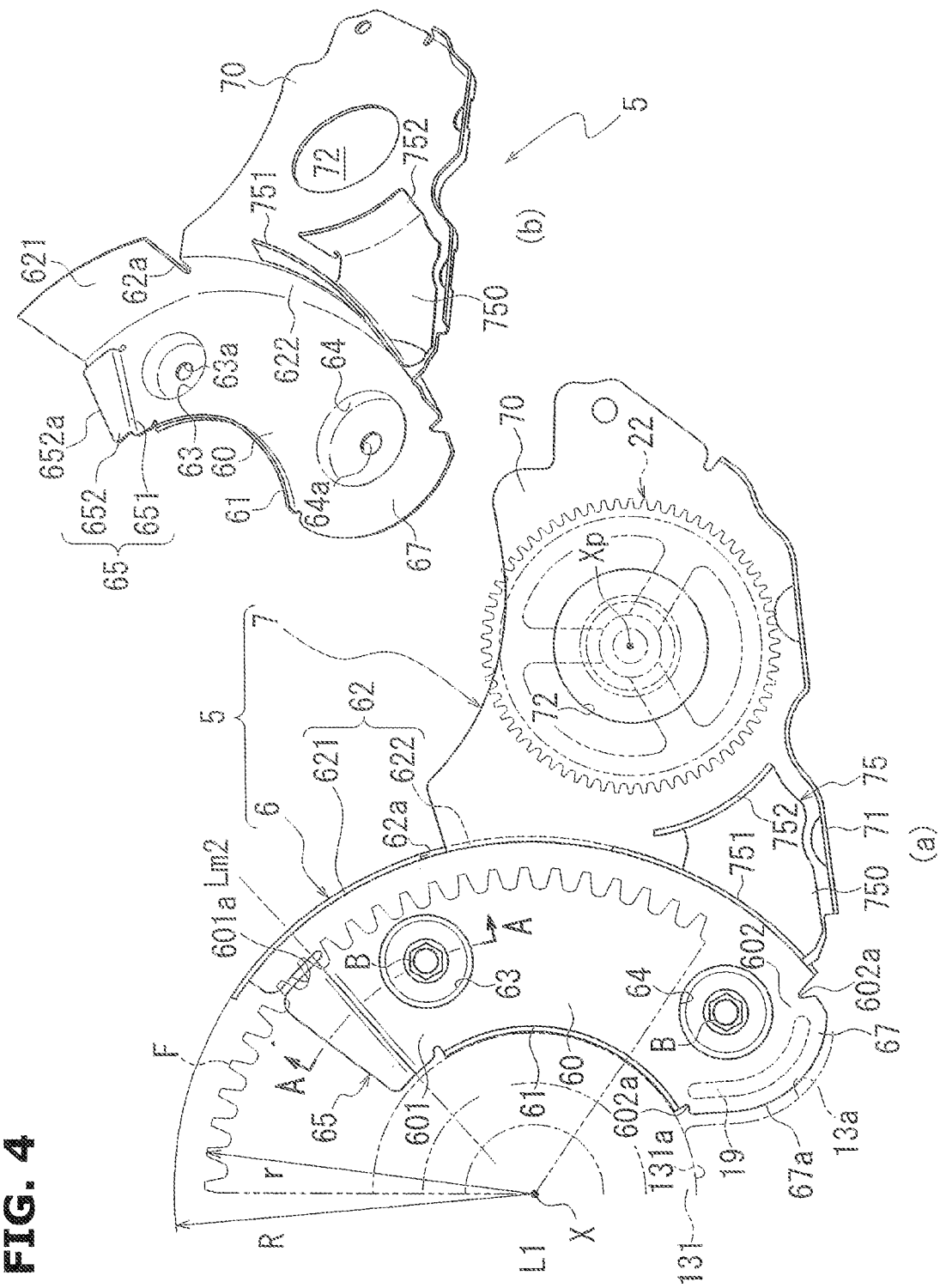
FIG. 4 are views for explaining the baffle plate.

FIG. 4 are views for explaining the baffle plate 5. FIG. 4(a) is a plan view of the baffle plate 5 when viewed in the direction of the axis X. FIG. 4(b) is a perspective view of the baffle plate 5.

Figure 5:
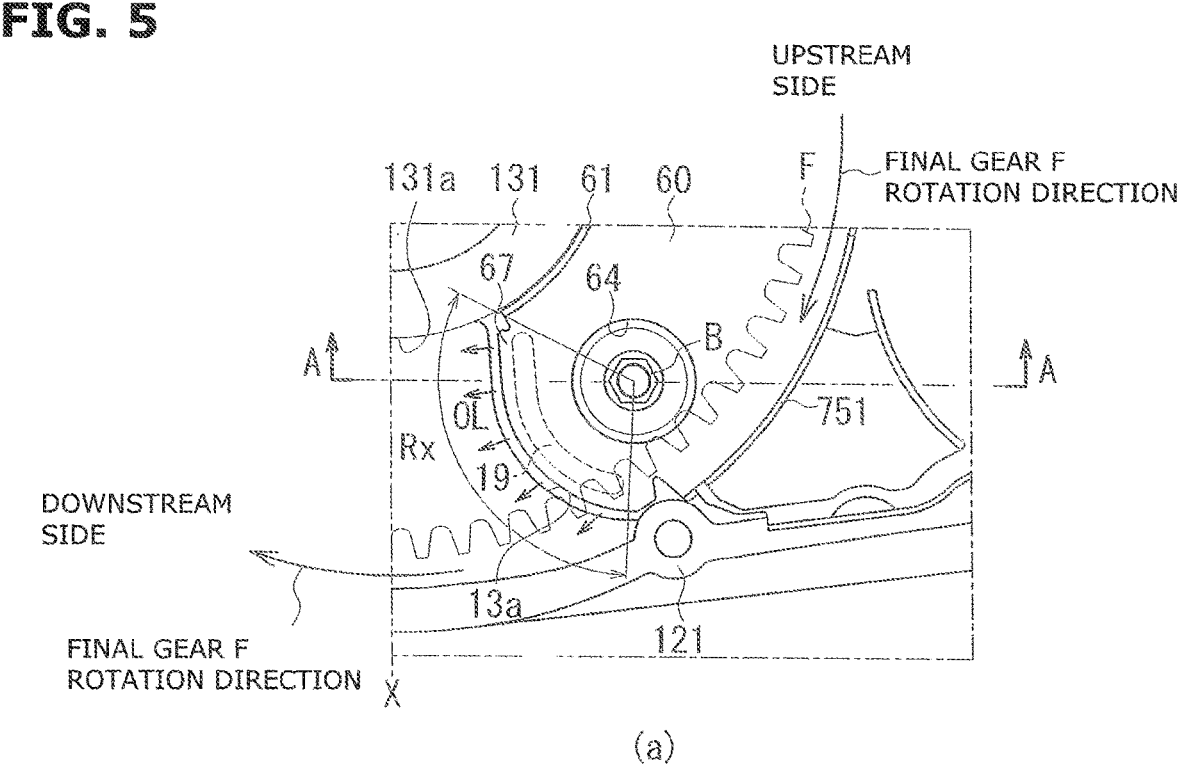
FIG. 5 are views for explaining a main part of the baffle plate.
Figure 5:
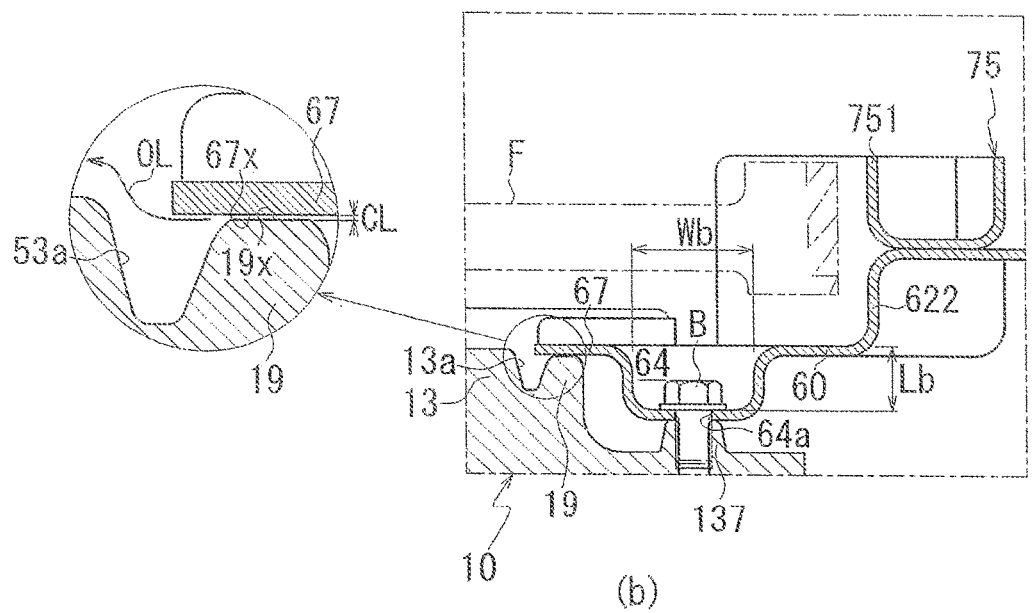

FIG. 5 are views for explaining a main part of the baffle plate 5. FIG. 5(a) is an enlarged view showing a portion around the flow amount adjusting portion 67 of the baffle plate 5 fixed to the transmission case 10. FIG. 5(b) is a view showing a section of the baffle plate 5 which is taken along an A-A line of FIG. 5(a), and the transmission case 10.

Figure 6:
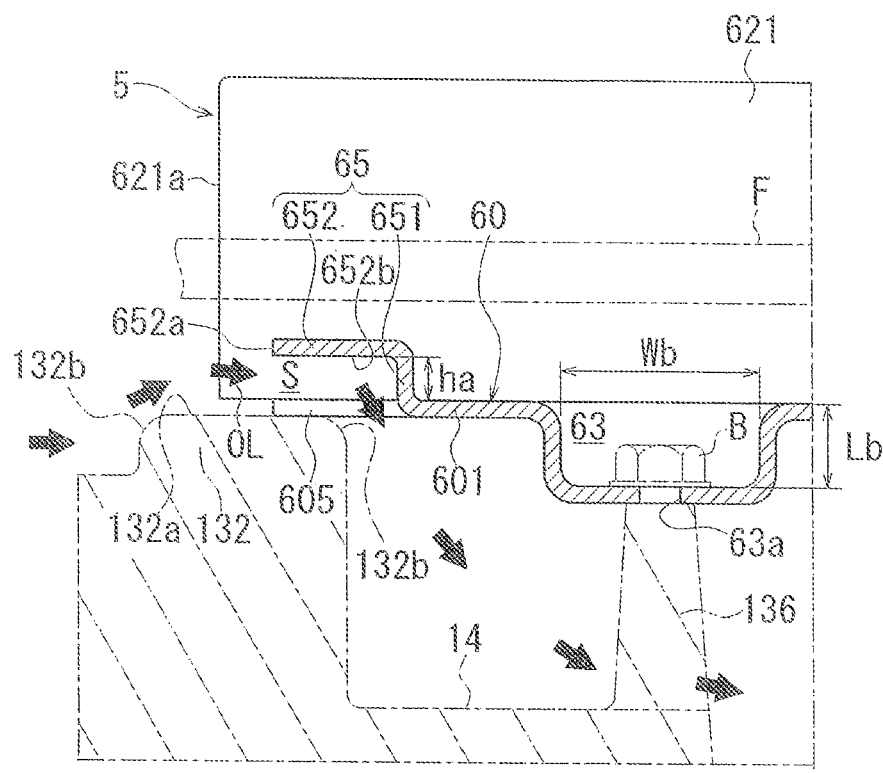
FIG. 6 is a view for explaining a main part of the baffle plate.

FIG. 6 is a view for explaining a main part of the baffle plate 5. FIG. 6 is a view showing a section of the baffle plate 5 which is taken along an A-A line of FIG. 4(a). The transmission case 10 side is shown by an imaginary line. In FIG. 6, a flow of the oil OL on the upstream side of the baffle plate 5 in the rotation direction of the final gear F is shown.

As shown in FIG. 3, the baffle plate 5 is provided to extend across a region of the transmission case 10 in which the final gear F is provided, and a region of the transmission case 10 in which the driven sprocket 22 is provided.

As shown in FIG. 4, the baffle plate 5 includes a first cover portion 6 covering a side surface of the final gear F; and a second cover portion 7 covering a side surface of the driven sprocket 22.

The first cover portion 6 and the second cover portion 7 are positioned at different positions in the direction of the axis X. The second cover portion 7 is positioned on the front side of the paper with respect to the first cover portion 6.

The first cover portion 6 includes a base portion 60 which has a plate shape in a plan view.

The base portion 60 extends in the circumferential direction around the axis X along the outer circumference 131a of the boss portion 131 on the transmission case 10 side. The base portion 60 has an arc shape in the plan view.

The base portion 60 includes an inner wall portion 61 which is provided at an edge on the inner circumference side of the base portion 60, and which protrudes on the front side of the paper.

The inner wall portion 61 is formed by bending up the inner circumference side of the base portion 60 on the front side of the paper.

The inner wall portion 61 has an arc shape along the outer circumference 131a of the boss portion 131 in the plan view. The inner wall portion 61 is provided to have a substantially same protruding height along the entire length in the circumferential direction around the axis X.

In the transmission case 10, the baffle plate 5 is provided so that the inner wall portion 61 is abutted on the outer circumference 131a of the boss portion 131 (cf. FIG. 3). The baffle plate 5 is positioned in the radial direction of the axis X by the inner wall portion 61 abutted on the outer circumference 131a of the boss portion 131.

As shown in FIG. 4(a), a radius R of the base portion 60 to the outer circumference is set to be greater than a radius of the final gear F to the outer circumference.

In a region of the transmission case 10 in which the first cover portion 6 of the baffle plate 5 is provided, the side surface of the final gear F on the wall portion 13 side is covered with the base portion 60 of the first cover portion 6.

The base portion 60 includes an outer wall portion 62 which is provided at an edge of the base portion 60 on the outer circumference side, and which protrudes on the front side of the paper.

This outer wall portion 62 is formed by bending up the outer circumference side of the base portion 60 on the front side of the paper.

The outer wall portion 62 includes a cutaway portion 62a which is provided at a middle position of the outer wall portion 62 in the circumferential direction around the axis X, The outer wall portion 62 is divided into two by the cutaway portion 62a.

When viewed in the direction of the axis X, an upper side region (a first outer wall portion 621) and a lower side region (a second outer wall portion 622) of the outer wall portion 62 with respect to the cutaway portion 62a have arc shapes along the outer circumference of the final gear F.

The first outer wall portion 621 is positioned on the upstream side of the second outer wall portion 622 in the rotation direction of the final gear F.

The second outer wall portion 622 on the downstream side is bent in a direction apart from the base portion 60. The bent second outer wall portion 622 is connected to the base portion 70 of the second cover portion 7.

Accordingly, the baffle plate 5 is integrally formed by the first cover portion 6 and the second cover portion 7.

In this embodiment, the baffle plate 5 is made by press forming one metal plate, except for a separator 75 described later.

The plate-shaped base portion 70 of the second cover portion 7 extends in a direction apart from the first cover portion 6. The base portion 70 is provided substantially parallel to the base portion 60 of the first cover portion 6.

As shown in FIG. 1 and FIG. 3, the second cover portion 7 is provided in a direction to traverse the opening portion 16 in the leftward and rightward directions of the drawing along the circumferential wall portion 11 of the transmission case 10.

In the transmission case 10, the base portion 70 of the second cover portion 7 is provided to traverse the rotation axis Xp of the oil pump. The base portion 70 includes a through hole 70 formed in a region crossing the rotation axis Xp, and which penetrates through the base portion 70 in a thickness direction of the base portion 70.

A rotation shaft penetrating through this through hole 72 is connected to the driven rocket 22 on the front side of the paper with respect to the base portion 70, so as to rotate as a unit with the driven sprocket 22.

As shown in FIG. 4(a), the separator 75 is mounted on the base portion 70 at a position closer to the first cover portion 6 in the region on the side wall portion 71 side. The separator 75 is arranged to divide into the space on the final gear F side, and the space on the driven sprocket 22 side.

The separator 75 includes a wall portion 751 having an arc shape along the outer circumference of the final gear F; a wall portion 752 having a shape along the outer circumference of the driven sprocket 22; and a mounting portion 750 provided between the wall portion 751 and the wall portion 752.

As shown in FIG. 5(b), the separator 75 is provided so that the wall portion 751 is substantially flush with the second outer wall portion 622 of the first cover portion 6.

As shown in FIG. 4, the first cover portion 6 includes recessed portions 63 and 64 which are provided at substantially central portions of the base portion 60 in a widthwise direction, and which are recessed in the back side of the paper. These recessed portions 63 and 64 are provided at an interval in the rotation direction of the final gear F (in the clockwise direction of FIG. 4(a)).

These recessed portions 63 and 64 are provided to correspond, respectively, the support cylinders 136 and 137 of the transmission case 10 side.

The recessed portions 63 and 64 are formed so that the base portion 60 is recessed in a direction apart from the final gear F.

Each of the recessed portions 63 and 64 forms a circle to surround a head portion of a bolt B with a predetermined clearance in a plan view. Through holes 63a and 64a of the bolts B are formed at central portions of the recessed portions 63 and 64.

Each of the recessed portions 63 and 64 have a width Wb in the diameter direction, and a depth Lb by which it is possible to receive the head portion of the bolt B (cf. FIG. 5(b), and FIG. 6).

As shown in FIG. 4, the first cover portion 6 of the baffle plate 5 includes a guide portion 65 provided at one end portion 601 of the base portion 60. The first cover portion 6 of the baffle plate 5 includes the flow amount adjusting portion 67 provided at the other end portion 602 of the base portion 60. The one end portion 601 of the base portion 60 is positioned on the upstream side of the other end portion 602.

As shown in FIG. 4(a), the base portion 60 of the first cover portion 6 includes the cutaway portions 602a and 602a which are provided to the other end portion 602, and which define a boundary between the inner wall portion 61 and the outer wall portion 62, and the flow amount adjusting portion 67.

The flow amount adjusting portion 67 extends from the other end portion 602 of the base portion 60 toward the downstream side in the rotation direction of the final gear F.

In a state where the baffle plate 5 is fixed to the transmission case 10, the flow amount adjusting portion 67 is provided in a range to extend over the rib 19 of the transmission case 10 side from the upstream side to the downstream side in the rotation direction of the final gear F when viewed from the front side of the paper.

A tip end 67a of the flow amount adjusting portion 67 has an arc shape along the stepped portion 13a of the transmission case 10 side. In the state where the baffle plate 5 is fixed to the transmission case 10, the tip end 67a of the flow amount adjusting portion 67 confronts the stepped portion 13a with a clearance in the rotation direction of the final gear F.

As shown in FIG. 5(b), the flow amount adjusting portion 67 includes a confronting surface 67x which confronts the rib 19, and which is a flat surface parallel to the tip end surface 19x of the rib 19.

In this embodiment, in a state where the baffle plate 5 is fixed to the transmission case 10, the confronting surface 67x of the flow amount adjusting portion 67 confronts the tip end surface 19x of the rib 19 with a predetermined clearance CL.

This clearance CL is set to adjust an amount of the oil OL moving from the upstream side (the right side in FIG. 5(b)) to the downstream side (the left side in FIG. 5(b)) of the rib 19 in the rotation direction of the final gear F when the final gear F is rotated.

This movement of the oil OL is caused by the negative pressure by the rotation of the final gear F.

As shown in FIG. 4(a) and FIG. 6, the guide portion 65 is provided on the upstream side of the base portion 60 in the rotation direction of the final gear F.

As shown in FIG. 4, the guide portion 65 is formed by bending the inner circumference side of the cutaway groove 601a provided to the base portion 60, along an imaginary line Lm2 (the diameter line of the final gear F) crossing the cutaway groove 601a, on the front side of the paper (the side closer to the final gear F).

As shown in FIG. 6, the guide portion 65 includes a first guide portion 651 which is perpendicular to the base portion 60; and a second guide portion 652 extending from a tip end of this first guide portion 651.

The second guide portion 652 is positioned at a position apart from the base portion 60 by a predetermined height ha. The second guide portion 652 extends in a direction apart from the recessed portion 63. The second guide portion 652 is provided parallel to the base portion 60.

The tip end edge 652a of the guide portion 65 is positioned on the downstream side of the end portion 621a of the first outer wall portion 621 in the rotation direction of the final gear F.

In this embodiment, after the recessed portions 63 and 64 are mounted on the support cylinders 136 and 137 (cf. FIG. 5(b) and FIG. 6), the first cover portion 6 of the baffle plate 5 is fixed to the support cylinders 136 and 137 by bolts B and B passing through the through holes 63a and 64a of the recessed portions 63 and 64.

In this state, the second guide portion 652 is disposed to confront an upper surface 132a of the rib 132 (cf. FIG. 3) of the transmission case 10 side, with a clearance S between the second guide portion 652 and the upper surface 132a (cf. FIG. 6).

Then, in this state, the tip end edge 652a of the second guide portion 652 is positioned at a substantially center of the width of the rib 132 in the rotation direction of the final gear F.

Moreover, in this state, in the base portion 60 of the first cover portion 6, the region in which the recessed portion 64 is provided (the region of the base portion 60 on the other end portion 602 side) is disposed on the lower side of the oil level (OL_level: FIG. 3) of the oil OL within the transmission case at the rotation of the final gear F.

Accordingly, the position of the recessed portion 64 in the base portion 60 is positioned on the downstream side in the rotation direction of the final gear F. The position of the recessed portion 64 in the base portion 60 is disposed on the lower side of the oil level OL_level (cf. FIG. 3) of the oil OL within the transmission case at the rotation of the final gear F.

Furthermore, in this state, the flow amount adjusting portion 67 provided to the other end portion of the base portion 60 is disposed to extend over the rib 19 on the transmission case 10 side from the upstream side to the downstream side in the rotation direction of the final gear F. Moreover, the predetermined clearance CL is ensured between the confronting surface 67x of the flow amount adjusting portion 67, and the tip end surface 19X of the rib 19.

Hereinafter, operations of the baffle plate 5 according to the embodiment are explained.

As shown in FIG. 3, when the final gear F is rotated around the axis X, the oil OL within the transmission case 10 is scooped up.

The scooped-up oil OL is scattered in the upward direction within the transmission case 10. Moreover, the amount of the oil OL on the final gear F side is decreased. On the other hand, the amount of the oil OL on the rotation transmission mechanism 2 side is increased. With these, the oil level OL_level of the oil OL within the transmission case 10 is brought to the state shown in FIG. 3.

The scooped-up oil OL is moved in the circumferential direction around the axis X, and acted to the guide portion 65 of the baffle plate 4 from the upper side in FIG. 3 (cf. arrows in the drawing).

As described above, the second guide portion 652 of the guide portion 65 is provided with the clearance S between the second guide portion 652 and the upper surface 132a of the rib 132 (cf. FIG. 6). Then, in the oil OL reaching the guide portion 65, the oil OL flowing along the rib 132 enters from the clearance S into the inside (the recessed portion 14 side) of the first cover portion 6 of the baffle plate 5.

Then, the oil OL entering the inside of the first cover portion 6 (the recessed portion 14 side) passes through the opening portion 16 and the opening 17, and finally returned to the oil pan (not shown).

Accordingly, the amount of the oil OL flowing into the outside (the final gear F side) of the first cover 6 is decreased. With this, it is possible to suppress the amount of the oil OL acted to the final gear F positioned outside the first cover portion 6.

Moreover, in the first cover portion 6, the flow amount adjusting portion 67 is provided on the downstream side in the rotation direction of the final gear F.

The support cylinder 137 provided to the recessed portion 14 of the transmission case 10 is provided at a position at which the support cylinder 137 is immersed in the oil OL at the rotation of the final gear F.

In this case, at the rotation of the final gear F, the height of the oil OL in the region on the downstream side of the support cylinder 137 in the rotation direction of the final gear F is lower than that in the region on the upstream side.

In the region of the recessed portion 14 around the support cylinder 137, the negative pressure is generated by the rotation of the final gear F. With this, the flow of the oil OL toward the stepped portion 13a side is generated.

In this embodiment, the rib 19 is provided between the support cylinder 137 and the stepped portion 13a. This rib 19 extends toward the radial direction of the rotation axis (the axis X) of the final gear F. The rib 19 is provided to have the range and the direction to cross the recessed portion 14.

Accordingly, by the negative pressure generated by the rotation of the final gear F, the flow of the oil OL crossing the rib 19 from the upstream side to the downstream side in the rotation direction of the final gear F is generated.

In this embodiment, the confronting surface 67x of the flow amount adjusting portion 67 confronts the tip end surface 19x of the rib 19 with the predetermined clearance CL (cf. FIG. 5(b)).

This clearance CL is set based on the experiment results and so on so that the oil OL of the amount necessary for the lubricant of the final gear F flows through the clearance CL into the final gear F side.

Accordingly, when the negative pressure is generated by the rotation of the final gear F, the oil OL around the rib 19, which has the amount necessary for the lubricant of the final gear F can flow through the clearance CL to the downstream side of the rib 19.

Then, the moved oil OL flows through the stepped portion 13a into a portion between the wall portion 13 and the final gear F so as to lubricate the final gear F.

That is, the oil OL is supplied through the clearance CL between the confronting surface 67x of the flow amount adjusting portion 67, and the tip end surface 19x of the rib 19, to the final gear F side (cf. a flow of the oil shown by midlines in FIG. 5(a)).

Accordingly, it is possible to suppress the total amount of the oil OL flowing into the final gear F side while ensuring the flow amount of the oil necessary for the lubrication of the final gear F.

With this, it is possible to suppress the total amount of the oil OL which causes the friction with respect to the rotation of the final gear F, and thereby to improve the fuel economy of the vehicle to which the automatic transmission is mounted.

Figure 7:
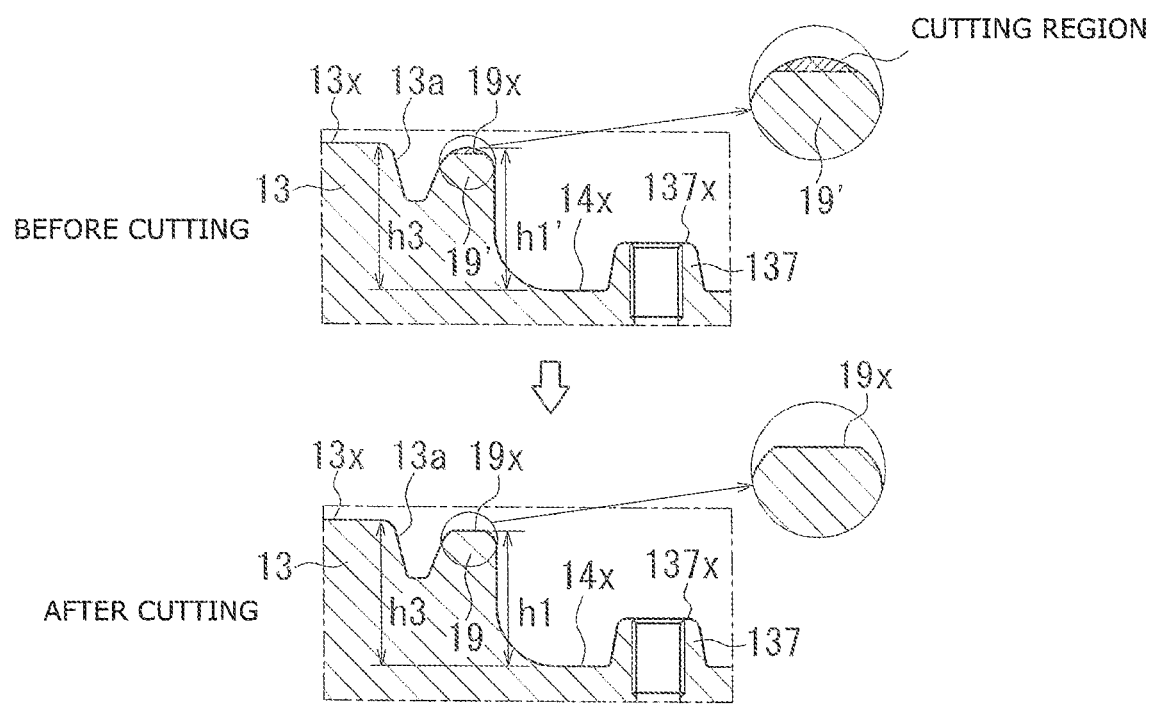
FIG. 7 is a view for explaining a manufacturing process of the rib.

FIG. 7 is a view for explaining a forming process of the rib 19 including the tip end surface 19x.

The transmission case 10 is formed by the casting using a pair of molds.

As described above, the tip end surface 19x of the rib 19 is needed to be formed with the accuracy so that the clearance CL between the tip end surface 19x of the rib 19 and the confronting surface 67x of the flow amount adjusting portion 67 becomes the intended clearance.

Accordingly, in this embodiment, as shown in FIG. 7, in the transmission case obtained by the casting, a region 19' which is finally formed into the rib 19 is formed to have a height h1' higher than a height h1 of the finally formed rib 19.

Then, a tip end side of the region 19' which is formed into the rib 19 is cut by a cutter and so on, so that the rib 19 having the flat tip end surface 19x is formed to have predetermined height h1.

With this, it is possible to accurately form the clearance CL between the tip end surface 19x of the rib 19 and the confronting surface 67x of the flow amount adjusting portion 67, to the intended clearance.

In this embodiment, the height h1' from the confronting surface 14x of the recessed portion 14 which confronts the final gear F, to an upper end of the region 19' which is formed into the rib 19 is lower than the height h3 from the confronting surface 14x of the recessed portion 14 to the confronting surface 13x of the wall portion 13.

Moreover, the height h1' is higher than the height h2 from the confronting surface 14x of the recessed portion 14 to the tip end surface 137x of the support cylinder 137.

Accordingly, when the upper end of the region 19' which is formed into the rib 19 is cut, the wall portion 13 and the support cylinder 137 are not cut.

Furthermore, in this embodiment, the rib 19 is disposed at a position at which the rib 19 is not abutted on the support cylinder 137, the circumferential wall portion 11, the stepped portion 13a, and the bolt boss portion 121.

Accordingly, when the upper end of the region 19' which is formed into the rib 19 is cut, it is difficult to generate the erroneous cut of the support cylinder 137, the circumferential wall portion 11, the stepped portion 13a, and the bolt boss portion 121.

Moreover, in a case where the portion which is other than the region 19' which is formed into the rib 19 is erroneously cut, the stress concentration is generated at the cut portion due to the cutting. This causes the deterioration of the durability. However, it is possible to prevent the generation of these matters.

Hereinafter, configurations of the automatic transmission (the driving force transmission device) according to the embodiment are described with effects thereof.

(1) The automatic transmission includes the final gear F (gear), the transmission case 10, and the baffle plate 5 positioned between the side surface of the final gear F, and the wall portion 13 of the transmission case 10.

In the transmission case 10, the first cover portion 6 of the baffle plate 5 is positioned between the final gear F and the wall portion 13 (the recessed portion 14) of the transmission case 10 in the direction of the rotation axis (the axis X) of the final gear F.

The first cover portion 6 of the baffle plate 5 includes the base portion 60 having the arc shape along the rotation direction of the final gear F.

The base portion 60 includes the flow amount adjusting portion 67 (downstream side end portion) which has a plate shape, which is an end portion on the downstream side in the rotation direction of the final gear F, and which is disposed to be perpendicular to the axis X.

In the transmission case 10, the rib 19 is provided on the region of the recessed portion 14 which confronts the flow amount adjusting portion 67. The rib 19 protrudes toward the flow amount adjusting portion 67.

The clearance CL is provided between the tip end surface 19X of the rib 19 (the surface on the flow amount adjusting portion 67 side), and the confronting surface 67x (surface) of the flow amount adjusting portion 67 of the baffle plate 5 which corresponds to the recessed portion 14.

The rib 19 includes the linear portion crossing the rotation direction of the final gear F.

In a region near the flow amount adjusting portion 67 (the downstream side end portion) of the baffle plate 5, when the final gear F is rotated, the oil flow is generated from the recessed portion 14 side (the back side) of the baffle plate 5 toward the front side (the final gear side).

In the automatic transmission, it is necessary to partly allow the oil flow from the back side to the front side of the baffle plate 5. Accordingly, it is necessary that there is the clearance between the baffle plate 5 and the transmission case 10.

However, in a case where the clearance is too large, the amount of the oil flowing into the final gear F side becomes much, so as to serve as the resistance with respect to the rotation of the final gear F.

By providing the rib 19 as described above, it is possible to decrease the clearance. With this, it is possible to decrease the amount of the oil flowing into the final gear F side.

Moreover, the rib 19 has the shape having the linear portion crossing the rotation direction of the final gear F. It is possible to adjust the overlapping amount between the baffle plate 5 and the rib 19 when viewed in the direction of the axis X.

For example, in a case where the overlapping amount between the baffle plate 5 and the rib 19 is increased, it is possible to decrease the oil amount flowing into the final gear F side, relative to a case where the dotted ribs are provided.

Moreover, by the rib having the linear shape, it is possible to improve the strength with respect to the stress in the longitudinal direction of the linear portion.

In case of the cutting by using the cutter, it is possible to cut by the cutter to avoid the peripheral stepped portion (for example, the boss portion 131, the circumferential wall portion 11, and the stepped portion 13a).

With this, it is possible to prevent the concentration of the stress to the cut portion due to the cutting of the peripheral stepped portion.

Moreover, the automatic transmission according to the embodiment includes below-described configurations.

(2) The transmission case 10 includes the opening portion 16 which is positioned at a position overlapped with the baffle plate 5, and which is connected through the opening 17 to the oil pan.

The linear portion of the rib 19 has a configuration in which an inclination angle (the curvature) is varied at a middle portion from the upper side end portion 191 (the inner circumference side end portion) to the lower side end portion 192 (the outer circumference side end portion) in the vertical direction in the installation state of the automatic transmission, so that the end portion 192 is closer to the opening portion 16).

The overlapping amount between the rib 19 and the flow amount adjusting portion 67 of the baffle plate 5 is increased. Accordingly, it is possible to suppress the flowing amount of the oil flowing from the oil pan side to the final gear F side.

That is, the overlapping amount between the rib 19 and the baffle plate 5 (the length Rx of the overlapping portion: FIG. 5) is increased when viewed in the direction of the rotation axis (the axis X) of the final gear F. Accordingly, it is possible to obtain the effect to suppress the amount of the oil OL flowing into the final gear F side (the oil suppression effect).

Moreover, the entire length of the rib 19 becomes long. Accordingly, it is possible to improve the rigidity of the transmission case 10, in addition to the rib 19.

Moreover, the part of the oil OL reaching the baffle plate 5 from the upper side in the vertical direction in the installation state of the automatic transmission is introduced to the back side (the recessed portion 14 side) of the baffle plate 5 by the guide portion 65 of the baffle plate 5.

The part of the oil OL introduced to the back side (the recessed portion 14 side) of the baffle plate 5 reaches the portion around the rib 19. By the oil OL reached to the portion around the rib 19, it is possible to suppress the amount flowing beyond the rib 19 into the final gear R.

Moreover, the automatic transmission according to the embodiment includes below-described configurations.

(3) The wall portion 13 of the transmission case 10 includes the stepped portion 13a which is positioned on the downstream side of the flow amount adjusting portion 67 in the rotation direction of the final gear F.

The confronting surface 13x of the wall portion 13 that confronts the final gear F in a region in which the stepped portion 13a is provided is closer to the final gear F than the tip end surface (surface) of the rib 19 with the final gear F.

In the region of the transmission case 10 in which the baffle plate 5 is not provided, the wall portion 13 having the stepped portion 13a is provided in the transmission case 10 on the downstream side of the flow amount adjusting portion 67 in the rotation direction of the final gear F. With this, the wall portion 13 can be provided near the final gear F.

With this, it is possible to decrease the clearance between the transmission case 10 and the final gear F. With this, it is possible to suppress the total amount of the oil OL flowing into the region of the transmission case 10 in which the baffle plate 5 is not provided (the region of the wall portion 13). Consequently, it is possible to suppress the stirring resistance of the final gear F.

Moreover, in the present invention, a manufacturing method of the automatic transmission (the driving force transmission device) including the following configurations can be specified. That is, (4) The automatic transmission includes the final gear F (gear), the transmission case 10, and the baffle plate 5 positioned between the side surface of the final gear F, and the wall portion 13 of the transmission case 10.

In the transmission case 10, the first cover portion 6 of the baffle plate 5 is positioned between the final gear F and the wall portion 13 (the recessed portion 14) of the transmission case 10 in the direction of the rotation axis (the axis X) of the final gear F.

The first cover portion 6 of the baffle plate 5 includes the base portion 60 having the arc shape along the rotation direction of the final gear F.

The base portion 60 includes the flow amount adjusting portion 67 (downstream side end portion) which has a plate shape, which is an end portion on the downstream side in the rotation direction of the final gear F, and which is disposed to be perpendicular to the axis X.

In the transmission case 10, the rib 19 is provided on the region of the recessed portion 14 which confronts the flow amount adjusting portion 67. The rib 19 protrudes toward the flow amount adjusting portion 67.

The clearance CL is provided between the tip end surface 19X of the rib 19 (the surface on the flow amount adjusting portion 67 side), and the confronting surface 67x (surface) of the flow amount adjusting portion 67 of the baffle plate 5 which corresponds to the recessed portion 14.

The rib 19 includes the linear portion crossing the rotation direction of the final gear F.

In the manufacturing method of the thus-constructed automatic transmission, the region 19' (raised portion) which is finally formed into the rib 19 is formed to the transmission case 10 by the casting so that the height h1' of the region 19' is higher than the height of the finally formed rib 19.

After the region 19' which is finally formed into the rib 19 is formed, the upper end of the region 19' is cut by the cutter and so on, so that the rib 19 having the flat tip end surface 19x is formed to have the predetermined height h1.

In the region 19' which is formed into the rib 19 by the casting, there is the large variation of the height.

Accordingly, the region 19' which is finally formed into the rib 19 is formed by the casting. Then, the upper end of the region 19' is cut by the cutter and so on to form the rib 19. With this, it is possible to preferably suppress the large variations of the clearance between the tip end surface 19x (the surface) of the rib 19, and the confronting surface 67x (the surface) of the flow amount adjusting portion 67 of the baffle plate 5, in the respective manufacturing products.

With this, it is possible to preferably prevent the large variations of the amounts of the oil flowing beyond the rib 19 into the final gear F side in the respective manufacturing products.

(5) The boss portion 131 (annular protruding portion) is provided on the recessed portion 14 of the transmission case 10. The boss portion 131 protrudes toward the final gear F.

The rib 19 is not abutted on the boss portion 131.

The region 19' (the raised portion) which is finally formed into the rib 19 is formed by the casting. Then, when the upper end of the region 19' is cut, the size of the cutter used at the cutting is restricted.

In a case where the rib 19 is abutted on the boss portion 131 (the annular protruding portion), the boss portion 131 may be also cut when the rib 19 is formed by cutting the region 19' (the raised portion).

In this case, a portion of the boss portion 131 which is abutted on the cutter is cut into the recessed shape. The stress due to the cutting is easy to be concentrated to the portion cut into the recessed shape.

In particular, in a case where the rib 19 is positioned in the transmission case 10 below the rotation axis (the axis X) of the final gear F in the vertical direction in the installation state of the automatic transmission, the load acted to the portion around the rib 19 is increased. In this case, the influence of the concentration of the stress acted to the portion around the rib 19 including the boss portion 131 becomes extremely large.

By providing the rib 19 so as not to be directly abutted on the boss portion 131 (the annular protruding portion), it is possible to decrease the possibility that the cutter contacts on the boss portion 131 at the cutting of the region 19' (the raised portion) which is finally formed into the rib 19.

With this, when the cutter contacts on the boss portion 131, it is possible to preferably prevent the cutting of the boss portion 131 into the recessed shape by the cutter. Accordingly, it is possible to decrease the stress concentration due to the cutting into the recessed shape.

(6) The transmission case 10 includes the circumferential wall portion 11 (wall portion) confronting the outer circumference teeth surface of the final gear F.

The rib 19 is not abutted on the circumferential wall portion 11.

In a case where the rib 19 is abutted on the circumferential wall portion 11 of the transmission case 10 side, the circumferential wall portion 11 of the transmission case 10 side may be also cut when the rib 19 is formed by cutting the region 19' (the raised portion) which is finally formed into the rib 19.

By the above-described configuration, it is possible to decrease the possibility that the cutter contacts on the circumferential wall portion 11 at the cutting of the region 19' which is finally formed into the rib 19.

With this, it is possible to preferably prevent the cutting of the circumferential wall portion 11 into the recessed portion when the cutter contacts on the circumferential wall portion 11. Accordingly, it is possible to decrease the stress concentration due to the cutting into the recessed shape.

(7) The wall portion 13 of the transmission case 10 includes the stepped portion 13*a* which is provided on the downstream side of the flow amount adjusting portion 67 in the rotation direction of the final gear F, and which is the boundary between the recessed portion 14 and the wall portion 13.

In a case where the rib 19 is abutted on the stepped portion 13*a* of the transmission 10 side, the stepped portion 13*a* of the transmission case 10 side may be also cut when the rib 19 is formed by cutting the region 19' (the raised portion) which is finally formed into the rib 19.

By the above-described configuration, it is possible to decrease the possibility that the cutter contacts on the stepped portion 13*a* at the cutting of the region 19' which is finally formed into the rib 19.

With this, it is possible to preferably prevent the cutting of the stepped portion 13*a* into the recessed portion when the cutter contacts on the stepped portion 13*a*. Accordingly, it is possible to decrease the stress concentration due to the cutting into the recessed shape.

(8) The support cylinder 137 is provided on the recessed portion 14 (the lower side region 14*b*) of the transmission case 10. The support cylinder 137 is arranged to fix the baffle plate 5 to the transmission case 10.

The support cylinder 137 includes the bolt hole 137*b* (a screw hole used for screw clamping) into which the shaft portion of the bolt B is screwed when the baffle plate 5 is fixed to the transmission case 10.

The transmission case 10 includes the stepped portion 13*a* provided on the downstream side of the flow amount adjusting portion 67 in the rotation direction of the final gear F.

The rib 19 is not abutted on the support cylinder 137 and the stepped portion 13*a*.

The rib 19 is disposed to pass through between the support cylinder 137 and the stepped portion 13*a*.

In a case where the rib 19 is abutted on the support cylinder 137 and the stepped portion 13*a* of the transmission 10 side, it is possible to decrease the possibility that the cutter contacts on the support cylinder 137 and the stepped portion 13a at the cutting of the region 19' which is finally formed into the rib 19.

With this, it is possible to preferably prevent the cutting of the support cylinder 137 and the stepped portion 13a into the recessed portion when the cutter contacts on the support cylinder 137 and the stepped portion 13a. Accordingly, it is possible to decrease the stress concentration due to the cutting into the recessed shape.

In the above-described embodiment, the driving force transmission device is the automatic transmission for the vehicle. However, the driving force transmission device according to the present invention is not limited to the automatic transmission for the vehicle.

The present invention is applicable to a device which including a gear train including a plurality of gears, and in which at least one of the gears scoops up the oil within the receiving case of the gear train. This device is, for example, a speed reduction device arranged to decrease a speed of an input rotation, and to output the speed-reduced rotation.

Hereinabove, the embodiment according to the present invention is explained. However, the present invention is not limited to the aspect shown in the embodiment. The present invention can be arbitrarily varied as long as they are included in the technical thought of the present invention.

The invention claimed is:

1. A driving force transmission device comprising:
   a gear;
   a case receiving the gear;
   a baffle plate positioned between a side surface of the gear and the case,
   the baffle plate including a downstream side end portion positioned at a most downstream position in a rotation direction of the gear,
   the case including a rib protruding toward the downstream side end portion,
   a clearance positioned between a surface of the rib and a surface of the baffle plate,
   the rib including a linear portion crossing the rotation direction of the gear,
   wherein the case includes an opening portion which is positioned at a position overlapped with the baffle plate; and
   wherein the linear portion has a configuration in which an inclination angle is varied at a middle portion from an upper side end portion to a lower side end portion so that the lower side end portion is closer to the opening portion.

2. The driving force transmission device as claimed in claim 1, wherein the case includes a stepped portion which is positioned on a downstream side of the downstream side end portion, and which includes a surface closer to the side surface of the gear than the surface of the rib.

3. A manufacturing method of an automatic transmission including a gear, a case receiving the gear, and a baffle plate positioned between a side surface of the gear and the case, the baffle plate including a downstream side end portion positioned at a most downstream position in a rotation direction of the gear, the case including a rib protruding toward the downstream side end portion, a clearance positioned between a surface of the rib and a surface of the baffle plate, the rib including a linear portion crossing the rotation direction of the gear, the manufacturing method comprising:
   forming a raised portion in the case by a casting; and
   cutting a surface of the raised portion to form the rib,
   wherein the case includes an opening portion which is positioned at a position overlapped with the baffle plate; and
   wherein the linear portion has a configuration in which an inclination angle is varied at a middle portion from an upper side end portion to a lower side end portion so that the lower side end portion is closer to the opening portion.

4. The manufacturing method of the driving force transmission device as claimed in claim 3, wherein the case includes an annular protruding portion protruding toward the gear; and the rib is not abutted on the annular protruding portion.

5. The manufacturing method of the driving force transmission device as claimed in claim 3, wherein the case includes a wall portion confronting an outer circumference teeth surface of the gear; and the rib is not abutted on the wall portion.

6. The manufacturing method of the driving force transmission device as claimed in claim 3, wherein
   the case includes a stepped portion which is positioned on a downstream side of the downstream side end portion, and which includes a surface closer to the side surface of the gear than the surface of the rib; and
   the rib is not abutted on the stepped portion.

7. The manufacturing method of the driving force transmission device as claimed in claim 3, wherein
   the case includes a screw hole portion arranged to fix the baffle plate by a screw;
   the case includes a stepped portion which is positioned on a downstream side of the downstream side end portion, and which includes a surface closer to the side surface of the gear than the surface of the rib;
   the rib is not abutted on the screw hole portion and the stepped portion; and
   the rib is disposed to pass through between the screw hole portion and the stepped portion.

* * * * *